United States Patent [11] 3,627,739

[72] Inventors Paul A. Devlin
 Lafayette;
 Eugene F. Lutz, Walnut Creek; Robert J.
 Patten, Pleasant Hill, all of Calif.
[21] Appl. No. 63,661
[22] Filed Aug. 13, 1970
[45] Patented Dec. 14, 1971
[73] Assignee Shell Oil Company
 New York, N.Y.

[54] POLYCYCLODELFIN POLYMERIZATION PROCESS AND PRODUCTS
 10 Claims, No Drawings
[52] U.S. Cl. .................................................. 260/88.2 D,
 260/93.1
[51] Int. Cl. .................................................. C08f 15/04,
 C08f 7/02
[50] Field of Search ........................................... 260/88.2 D,
 93.1

[56] References Cited
 UNITED STATES PATENTS
 3,023,200 2/1962 Epstein et al. ................. 260/93.1
 3,074,918 1/1963 Eleuterio ....................... 260/93.1
 3,459,725 8/1969 Natta et al. .................... 260/93.1
 3,498,961 3/1970 Tazuma ......................... 260/93.1
 3,575,947 4/1971 Crain ............................. 260/93.1

Primary Examiner—Joseph L. Schofer
Assistant Examiner—Richard A. Gaither
Attorneys—Martin S. Baer and Norris E. Faringer ABSTRACT: Heat curable polycycloolefin compositions comprising (1) a mixture of at least one polycycloolefin having a strained carbocyclic ring, and (2) at least one oxyhalide of molybdenum or tungsten containing at least three atoms of halogen per molecule, which compositions are curable to tough hard products.

3,627,739

POLYCYCLODELFIN POLYMERIZATION PROCESS AND PRODUCTS

BACKGROUND OF THE INVENTION

This invention relates to new heat curable compositions comprising at least one polycycloolefin having a strained carbocyclic ring and an oxyhalide of molybdenum or tungsten at least three atoms of halogen per molecule.

It is heretofore known that Group VIb metal halides polymerize polycycloolefins, but only slowly, if at all, in the absence of an activating cocatalyst or solvent such as a Lewis acid or carbon tetrachloride or carbon disulfide, and at low temperature.

It has now been found that certain polycycloolefins may be polymerized and cured in the presence of certain oxyhalides of molybdenum and tungsten to tough, insoluble products having in addition other desirable properties as will be hereinafter apparent.

The invention relates to a heat curable composition comprising a mixture of at least one polycycloolefin having a strained carbocyclic ring and an oxyhalide of molybdenum or tungsten containing at least three atoms of halogen per molecule. The compositions according to the invention may be cured to products which are hard insoluble resinous materials, and may therefore be advantageously employed in a wide variety of applications such as, for example, pottings, castings, laminates, impregnated building materials and the like.

The invention further provides a polymerization process whereby high molecule weight polycycloolefin polymers are produced in short reaction time; more particularly, the invention provides an improved polymerization process comprising contacting at least one polycycloolefin with a catalytic amount of an oxyhalide of molybdenum or tungsten containing at least three atoms of halogen per molecule at a temperature in the range between about 20° C. and a higher temperature at which the monomer and/or polymer begins to thermally decompose, preferably between about 30° C. and 175° C.

DESCRIPTION OF THE PREFERRED EMBODIMENTS

The polycycloolefins employed in the compositions and process of this invention suitable contain at least one unsubstituted ring double bond. Surprisingly, the oxyhalides of the present invention are ineffective for polymerizing monocyclic olefins such as cyclopentene and cyclooctene. Polycycloolefins containing a strained carbocyclic ring are defined herein as those having a five-membered or seven-membered carbocyclic ring.

The polycycloolefins contain at least two, preferably from tow to four rings, which may may be unsubstituted or substituted with, e.g., lower alkyl groups, an alkenyl group and the like. Examples of the polycyclic olefins employed in the compositions and process of the invention are endo-dicyclopentadiene, exodicyclopentadiene, dihydrodicyclopentadiene, norbornene, norbornadiene, 1-methyl bicyclo[2,2,1]hept-2-ene, 5,5-dibutyl bicyclo[2,2,1]hept-2-ene, 5-methyl, 5-vinyl bicyclo[2,2,1]hept-2-ene, 5-isopropenyl bicyclo[2,2,1]hept-2-ene, 1,7,7-trimethyl bicyclo[3,2,1]hept-2-ene, tricyclo[6,1,0$^{2,7}$]undeca-4;9-diene, tetracyclo[6,2,1$^{.6}$0$^{2,7}$]dodec-4-ene etc.

Preferably the polymer is a homopolymer of dicyclopentadiene or norbornene; however, the copolymerization of dicyclopentadiene with not more than 50 mol percent, preferably not more that 10 mol percent of polycycloolefins such as norbornene or norbornadiene is also preferred. The polymers obtained according to the invention may be thermally cured to useful, tough, hard, insoluble products having utility for laminates, castings, surface coatings, adhesives and the like.

The initiator the for compositions and process according to the invention is an oxyhalide of molybdenum or tungsten and containing at least three atoms of halogen per molecule. Thus the catalyst contains molybdenum or tungsten. Suitable halogens are chlorine, bromine, and fluorine. Examples of suitable initiators are molybdenum oxytetrachloride, molybdenum oxytrichloride, molybdenum trioxyhexachloride ($Mo_2O_3Cl$), molybdenum trioxypentachloride ($Mo_2O_3Cl_5$), molybdenum oxytetrafluoride, tungsten oxytetrabromide, tungsten oxytetrachloride, tungsten oxytetrafluoride and the like. Preferred are those containing three or four atoms of halogen per atom of metal; oxyhalides having only two halogens such as molybdenum dioxydichloride have been found to be of substantially lower activity.

The amount of said catalyst to be used may vary within relatively wide limits. Amounts between about 0.01 to about 5 mol percent catalyst are suitable; amounts between about 0.02 and about 1 mol percent being preferred.

The polymerization generally gives rise to polymers containing repeating units in which the unit has one ring structure less than the original monomer; however, other structures may also be present depending upon the particular monomers and conditions.

The polymerization is preferably effected with the polycycloolefin in the liquid phase, and may be effected in the presence of a substantially inert solvent such as paraffinic hydrocarbons, e.g., cyclohexane, n-heptane, isooctane and the like. For some applications, the compositions may contain small amounts, e.g., up to about 30 percent by weight, preferably from about 0.2 to 25 percent by weight of an olefinic reactive diluent such as styrene, divinyl benzene, and the like. However, it is a particular advantage that solvents and diluents may be altogether absent and the polymerization carried out in bulk. It has been found that moisture adversely influences the reactivity of the catalyst. The polycycloolefin and liquid diluent, if employed, preferably contain less than 100 parts per million by weight of water and other protonic agents. This may be achieved by such means as azeotropic distillation, or by treatment with desiccating agents such as calcium hydride. Various additives which are inert throughout the polymerization can be incorporated into he monomer mixture. Examples of such additives are pigments, dyes, fillers, heat stabilizers, antioxidants, ultraviolet light stabilizers, antistatic agents and the like.

The temperature and pressure to be employed is dependent upon the materials reacted and the catalyst employed and upon the nature of the products desired. The temperature at which the polymerization takes place will mostly be between about 20° to about 200° C. preferably between about 30 and about 175° C. However, excessive exposure to those higher temperatures should be minimized to avoid decomposition of the monomer(s) and/or polymer. Subatmospheric, atmospheric or superatmospheric pressures may be employed.

The catalyst may be added to he polycycloolefin in any convenient manner; for example, in a powdered or granular form or as a slurry or suspension in a suitable liquid medium, e.g., hydrocarbon oil. The catalyst may be added to the polycycloolefin all at once of continuously or intermittently over a certain period of time until the required amount is added. Since the reaction is exothermic in many cases regulating the rate of addition of catalyst may be suitable means of controlling or aiding a control of the reaction temperature within the desired limits. The amount of catalyst used may affect the characteristics of the higher molecular weight resin or resinous materials formed. Generally it will be necessary to conduct the polymerization in an inert atmosphere as even brief exposure to an oxygen containing environment such as air adversely influences the reactivity of the catalyst. The compositions according to the invention are thermosetting compositions suitable for reinforced laminates, castings, surface coatings and the like.

To illustrate the manner in which the invention may be carried out, the following examples are given. Unless otherwise specified, parts disclosed in the examples are parts by weight.

EXAMPLE I

Into an open mold in a dry nitrogen atmosphere was placed 500 parts of liquid dicyclopentadiene (DCPD) containing less than 100 parts per million on the polycycloolefin of water at a temperature of 35° C. and two parts of molybdenum oxytrichloride. The mixture exhibited a mild exothermic reaction and gelled within 5 minutes. The soft gelled product was cured one hour at 140° C. resulting in a hard brown resinous product having the following properties:

| | |
|---|---|
| Flexural strength  p.s.i. | 9,200 |
| Flexural modulus  p.s.i. | $3.2 \times 10^{-5}$ |
| Tensile strength  p.s.i. | 7,200 |
| Tensile elongation  % | 4.2 |
| Tensile modulus  p.s.i. | $3.0 \times 10^{-5}$ |
| Hardness (Shore C) | 95 |
| Izod Impact Strength | 0.78 |
| Dielectric constant | 2.4 |
| Dissipation factor | 0.007 |
| Volume resistivity | $10^{16}$ ohm |

EXAMPLE II

Into a glass reaction vessel from which the air had been displaced with dry nitrogen were added 5 ml. of norbornene at 60° C. and 0.04 g. of molybdenum oxytrichloride and the mixture gently agitated. A gelatinous polymer formed within about a minute.

EXAMPLE III

Into a glass reaction vessel from which the air had been displaced with dry nitrogen were added 5 ml. of DCPD at 60° C. and 0.05 g. of molybdenum oxytrichloride and the mixture gently agitated by shaking the vessel. A gelatinous polymer formed with a few minutes. The procedure was repeated with an initiator outside the scope of the invention, molybdenum dioxydichloride. No gel was observed in 2 hours.

EXAMPLE IV

The procedure of example III is repeated with additional initiators outside the scope of the invention. Vanadium oxytrichloride or chromium oxychloride show no or only a slight tendency to polymerize.

EXAMPLE V

In a glass reaction vessel from which the air had been displaced with dry nitrogen was added 5 ml. of DCPD at 60° C. which was cooled to form a solid at 24° C. 0.05 g. of molybdenum oxytrichloride were added and mixed with a stainless steel rod. No reaction was observed. After about 45 minutes, the composition was heated to 60° C. resulting in a gelled polymer in about 2 minutes. The polymer cured satisfactory at 140° C. resulting in a product of somewhat lower hardness than example I.

EXAMPLE VI

In a glass reaction vessel from which the air had been displaced with dry nitrogen were added 1 ml. of norbornene and 4 ml. of DCPD each at a temperature of 60° C. and 0.05 g. of molybdenum oxytrichloride. The temperature was raised to 140° C. for 3 hours resulting in a dark brown resinous solid having a Shore "C" hardness of 70.

The above procedure was repeated except that norbornene is replaced with 0.05 ml. of bicycloheptadiene and that 4.5 ml. of DCPD was used. The cured composition exhibited a Shore "C" hardness of 60.

EXAMPLE VII

In a glass reaction vessel from which the air had been displaced with dry nitrogen were added 5 ml. of heptane at 20° C. and 5 ml. of liquid DCPD at 60° and 0.05 g. of molybdenum oxytrichloride and the mixture gently agitated by shaking. A polymeric gelatinous precipitate was formed in about 7 minutes.

The procedure was repeated except that the molybdenum oxytrichloride is replaced with molybdenum pentachloride. No polymer was observed even after 16 hours when the test was discontinued.

The procedure was repeated except that the reaction mixture was 8 ml. of n-heptane and 2 ml. of DCPD; again when employing molybdenum oxytrichloride polymer formed within a few minutes, but no polymer was observed using molybdenum pentachloride after 16 hours.

EXAMPLE VIII

To illustrate the suitability of the compositions of the invention for laminating applications the following experiment was conducted.

In an inert atmosphere 6 ml. of liquid DPCD at about 35° C. (which had been dried to less than 100 p.p.m. of water with calcium hydride) was mixed with 0.02 g. of molybdenum oxytrichloride and the mixture poured into a Petri dish containing two layers of dried glass cloth. After 3 hours, without any additional heat being applied, the laminate had cured to a Barcol hardness of 10.

EXAMPLE IX

To illustrate that the cured compositions according to the invention exhibit advantageous low water absorptivity the following experiment was conducted.

A composition of 5 ml. of DCPD and 0.02 g. of molybdenum oxytrichloride was cured 2 hours at 140° to form a resinous coupon. The weighed coupon was immersed in distilled water at room temperature (about 23° C.) for a period of time which it was carefully dried on the surface with a paper tissue and reweighed, after which the coupon was again totally immersed in water and reweighed at various time intervals as noted in the following table.

For comparison the procedure was repeated with a commercially available bisphenol A based epoxy resin having an oxirane equivalent weight of 190, cured with 14.5 phr meta phenylene diamine 16 hours at 80° and 4 hours at 160° C. to form a coupon of like dimension. As may be seen from data in the table, the cured composition according to the invention absorbed only about 0.4 percent water after 76 days compared to 7 days for the cured epoxy resin.

TABLE

| Time | Water absorptivity of cured resins Polycycloolefin | % Weight Gain Epoxy Resin |
|---|---|---|
| 1 day | | 0.12 |
| 2 days | 0.07 | |
| 7 days | 0.05 | 0.40 |
| 30 days | | 0.91 |
| 40 days | 0.26 | |
| 76 days | 0.39 | |

We claim as our invention:

1. A heat-curable composition comprising:
   a. at least one polycycloolefin having a strained carbocyclic ring, and
   b. from about 0.01 to about 5 mole percent based on polycycloolefin of at least one oxyhalide of molybdenum or tungsten containing at least three atoms of halogen per molecule.

2. A composition as in claim 1 wherein the oxyhalide is of molybdenum.

3. A composition as in claim 1 wherein the oxyhalide is molybdenum oxytrichloride.

4. A composition as in claim 1 wherein the oxyhalide contains three or four atoms of halogen per atom of metal.

5. A composition as in claim 1 wherein the polycycloolefin contains a five-membered ring.

6. A composition as in claim 5 wherein the polycycloolefin is at least 50 mole percent dicyclopentadiene.

7. A composition as in claim 1 wherein the amount of oxyhalide is from about 0.02 to 1 mole percent.

8. A cured composition according to claim 1.

9. A process for the polymerization of at least one polycycloolefin at a temperature in he range from about 20° to about 175° C. by contacting said polycycloolefin with a catalytic amount of a catalyst consisting essentially of at least one oxyhalide of molybdenum or tungsten containing at least three atoms of halogen per molecule.

10. A process as in claim 9 wherein the polycycloolefin and the liquid diluent, if employed, contain less than 100 parts per million by weight of water and other protonic agents.

* * * * *